United States Patent
Remele et al.

(10) Patent No.: US 10,077,753 B2
(45) Date of Patent: Sep. 18, 2018

(54) RETROFIT RELAYS FOR USE IN A MOTOR VEHICLE AND CORRESPONDINGLY EQUIPPED MOTOR VEHICLE

(71) Applicant: VOLKSWAGEN AG, Wolfsburg (DE)

(72) Inventors: Juri Remele, Rühen (DE); Jörg Speh, Braunschweig (DE); Sven Strempel, Uetze (DE); Uwe Neugebauer, Isenbüttel (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 15/789,646

(22) Filed: Oct. 20, 2017

(65) Prior Publication Data

US 2018/0119661 A1 May 3, 2018

(30) Foreign Application Priority Data

Nov. 2, 2016 (DE) ........................ 10 2016 221 486

(51) Int. Cl.
*F02N 11/08* (2006.01)
*H01H 47/00* (2006.01)

(52) U.S. Cl.
CPC ........ *F02N 11/087* (2013.01); *F02N 11/0807* (2013.01); *H01H 47/001* (2013.01); *F02N 2011/0874* (2013.01)

(58) Field of Classification Search
CPC .. F02N 11/087; F02N 11/0807; F02N 11/084; F02N 2011/0874; H01H 47/001; B60R 25/209
USPC ................... 123/179.2, 179.3, 179.5
See application file for complete search history.

(56) References Cited

FOREIGN PATENT DOCUMENTS

EP 2032396 A2 3/2009

*Primary Examiner* — Hai Huynh
(74) *Attorney, Agent, or Firm* — Barnes & Thornburg LLP

(57) ABSTRACT

An internal combustion engine provides mechanical torque and electrical energy for the operation of remote-controlled standstill air conditioning (remote start) in conventional vehicles. A new terminal is introduced for the remote start. A retrofit solution is offered for this terminal concept. A retrofit relay is provided which is plugged into a free relay receptacle of the motor vehicle. The retrofit relay has a contact which is connected to an output of a body control module which signals the receipt of a remote control command for initiating the "standstill air conditioning" operating state. The retrofit relay also has a contact which is connected to an output of a body control module which signals the receipt of an "ignition on" command for initiating the "driving mode" operating state. The retrofit relay includes a logic circuit which carries out a combination of the signals of the fourth and the fifth relay contacts.

14 Claims, 2 Drawing Sheets

RETROFIT RELAYS FOR USE IN A MOTOR VEHICLE AND CORRESPONDINGLY EQUIPPED MOTOR VEHICLE

PRIORITY CLAIM

This patent application claims priority to German Patent Application No. 10 2016 221 486.1, filed 2 Nov. 2016, the disclosure of which is incorporated herein by reference in its entirety.

SUMMARY

Illustrative embodiments relate to a retrofit relay for use in a motor vehicle for implementing the function of the remote-controlled start of the internal combustion engine. Illustrative embodiments also relate to a motor vehicle equipped with a corresponding receptacle for accommodating the retrofit relay.

BRIEF DESCRIPTION OF THE DRAWINGS

Exemplary embodiments are represented in the drawings and are described in greater detail in the following with reference to the figures, in which.

DETAILED DESCRIPTION

Figure 1:
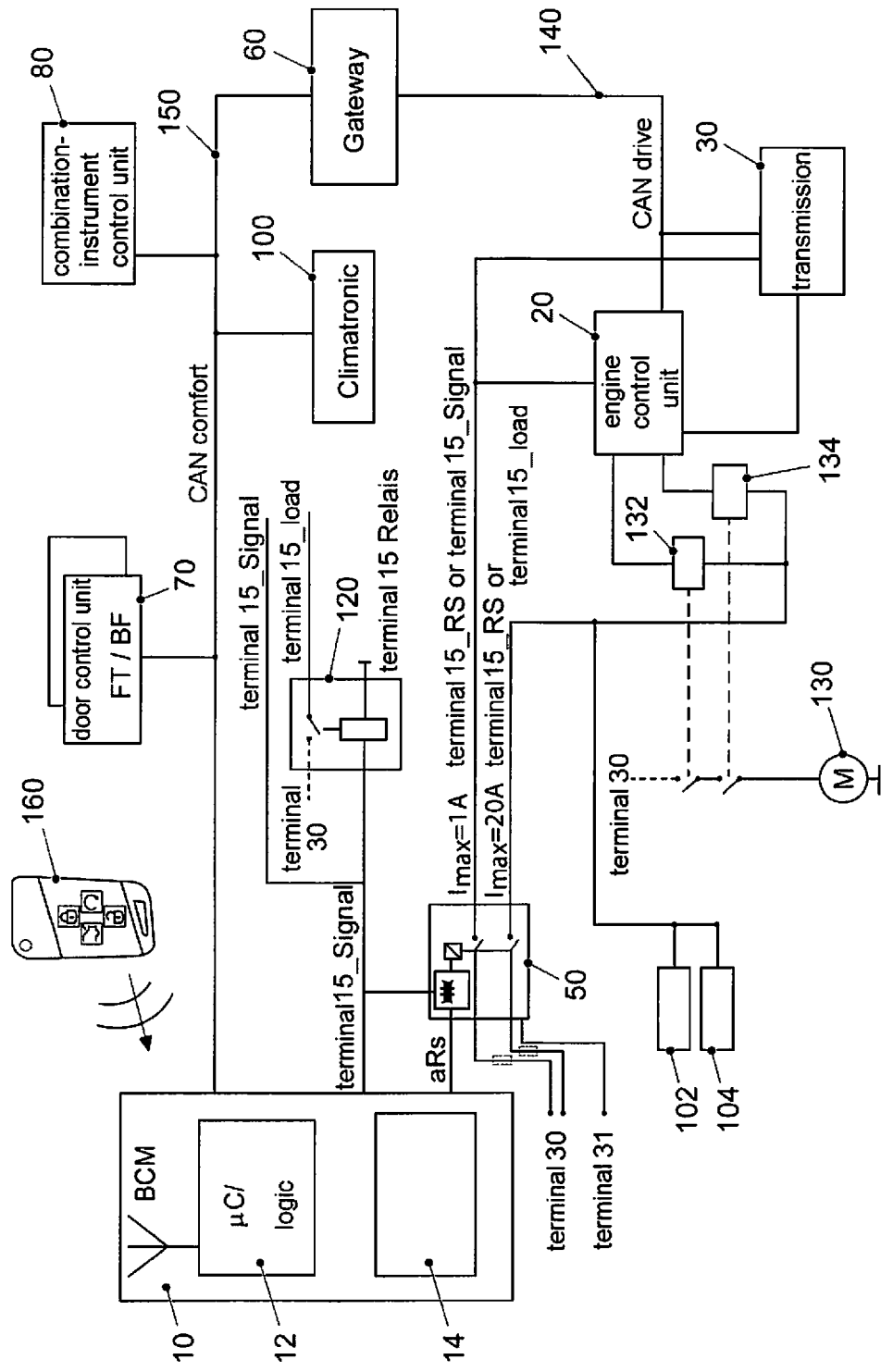
FIG. 1 shows a block diagram of the vehicle electrical/electronics systems comprising the disclosed retrofit relay.

In some countries, especially in very hot regions of the earth, remote-controlled standstill air conditioning is a popular comfort feature in motor vehicles. In this case, the internal combustion engine is started via remote control (remote start) and the air conditioning system is operated to cool the vehicle interior. The air-conditioner compressor is still operated mechanically in vehicles comprising an internal combustion engine; this takes place, therefore, only when the internal combustion engine is running. For a remote-controlled engine start, the terminal 15 of the vehicle electrical system must be switched on, as usual. All electrical and electronic components of the vehicle are switched on via the terminal 15. Therefore, all control units, sensors, and actuators are then switched on and a full activation of the vehicle is therefore achieved. In this regard, the remote control command would be equivalent to switching on the ignition by turning the ignition key, or by pressing the start/stop engine switch (keyless locking system), which is often the case nowadays. In the "standstill air conditioning" operating state, however, since the vehicle driver is not even in the vehicle and the vehicle cannot be moved, it is necessary to deliberately switch off some of the activated functions as a safeguard against theft and for safety of use. In the "standstill air conditioning" operating state, it should not be possible, for example, to release the electrical parking brake or to be able to operate the electrical window lifters. In addition, a theft warning system should not be deactivated. A considerable amount of effort is required to selectively switch off functions after the full activation of the vehicle, since every function, including future functions, must be investigated with respect to theft protection and safety of use in the "standstill air conditioning" operating state. Even if the vehicle driver is not in the vehicle in the "standstill air conditioning" operating state, it is possible for persons to be in the vehicle or persons may want to gain unauthorized access to the vehicle.

EP 2 032 396 B1 describes a concept for the remote start, in which a full activation of the vehicle does not take place as a result of the remote-controlled start. Instead, only those components are activated that are required for the comfort function of the standstill air conditioning. For this purpose, the required components are operated in a separate circuit. Practically speaking, a new terminal 15_RS (RS for remote start) is therefore introduced, which is switched to the battery voltage when a control unit receives the remote control command. The battery supply only supplies the components, however, that are required for the function of the standstill air conditioning, i.e., for example, the control units for the engine, the air conditioning system, etc. The other components remain switched off. There is no need to carry out a selective shutoff of functions in control units that are not actively required for the "standstill air conditioning" operating state.

The solution known from EP 2 032 396 B1 can bring benefits in the development of new vehicle models. The "standstill air conditioning" comfort feature is not a feature of the standard equipment package of a motor vehicle, however, and, in fact, is permitted in only a few markets. For production-related reasons, it is desirable to configure the vehicle electrical/electronics systems in such a way that different terminal concepts/wiring harnesses are not utilized in the various models. In addition, there is the requirement of the marketing groups that the "standstill air conditioning" equipment package also be available to the customer in a retrofit version.

The disclosure, with respect to the "standstill air conditioning" comfort feature (remote start), configures the vehicle electrical/electronics systems so that a retrofit solution can be offered to the customer. The terminal concept is to be identical for the basic version and the comfort version in this case.

This is achieved by a retrofit relay for implementing the function of the remote-controlled start of the internal combustion engine of the motor vehicle.

According to the disclosed solution, the retrofit relay is provided not only with the usual contacts for vehicle ground, battery voltage, connected battery voltage, and a relay contact for connection to an output of a control unit, via which the switching-on of the "ignition on" function is signaled, but also with an additional relay contact for connection to a second output of the control unit, via which the switching-on of the "remote start" function is signaled.

In addition, the retrofit relay contains a logic circuit which implements a logical combination of the signals of the "ignition on" function and the "remote start" function. The logical combination of the two signals can take place in the manner of a simple logical OR gate.

In yet another disclosed embodiment, the combination of the two signals can take place by a higher logic. With the aid of a higher logic, it is possible, for example, during an active "ignition on" signal, for an activation of the "remote start" signal to be ignored after the "ignition on" signal becomes passive. In this case, the terminal 15_RS is not switched on by the relay. The "ignition on" signal overrides the "remote start" signal. Therefore, a vehicle that has been fully activated by the "ignition on" function is always switched off during "ignition off", independently of the state of the signal of the "remote start" function. With the aid of the higher logic, it is therefore possible for the "remote start" function to be activated only from the "standstill" ("ignition off")

operating state. In at least one disclosed embodiment, the higher logic can also be connected upstream from the OR gate.

When retrofitting is carried out in the workshop, this retrofit relay is plugged into a free receptacle. In this case, the receptacle is situated in such a way that it is positioned upstream of those components (control units, sensors, and actuators) that are absolutely required for the "standstill air conditioning" operating state and, therefore, must be supplied with current and voltage via the retrofit relay. The cabling of the retrofit relay can be carried out manually in the workshop. In this case, the cables, which are otherwise switched by the conventional switching relay, would be removed from the conventional relay and plugged into the retrofit relay.

Another benefit of this design is that the other components that are not supplied via the retrofit relay can remain switched off. They will continue to be supplied via another conventional switching relay comprising a terminal 15. A selective function disabling is therefore no longer required for this group of components.

At least one disclosed embodiment provides that the retrofit relay comprises a circuit for ensuring a start pulse strength. That is the guarantee of the function for a certain time for defined battery voltage dips during the engine start. Not all outputs of a control unit frequently referred to as a body control module are designed to have start pulse strength. If this start pulse strength is transferred to the retrofit relay, the conventional control unit can continue to be used. Thus there is no need to develop/procure a new control unit for the retrofit solution to function. Any free output of the body control module can be utilized, which then signals the receipt of a command for the remote-controlled start of the internal combustion engine.

The circuit for ensuring a start pulse strength may be implemented as a monostable flip-flop. However, the logic circuit itself, i.e., either the OR gate or the higher logic may also be designed to have start pulse strength. This can be achieved by selecting the semiconductor technology accordingly.

The monostable flip-flop is designed in such a way that it can compensate for a dip in the signal voltage on the aforementioned relay contact for at least a predetermined time. The predetermined time is determined based on the voltage dips that are typically to be expected during the start of the internal combustion engine.

The disclosed embodiments also relate to a correspondingly equipped motor vehicle.

The present description illustrates the principles of the disclosure. It is therefore understood that persons skilled in the art will be able to design various arrangements that are not explicitly described here, but which embody principles of the disclosure and the scope of which is also to be protected.

FIG. 1 shows a simplified block diagram of the vehicle electronics system of a passenger car comprising an automatic transmission. The term "passenger car" is not intended to be limiting in this case; alternatively, this could be an entirely different type of motor vehicle, such as a truck, a bus, a construction-site truck, an agricultural machine, etc.

A so-called body control module is labeled with the reference number 10. The body control module is designed to perform a plurality of functions. In addition to the pure processing capacity, this primarily relates, however, to the capability to process (by mechanical switches and sensors) a very large number of input signals and, therefore, to switch and monitor a plurality of output loads, for example, headlights, turn signals, tail lamps, interior lighting, windshield wipers, and a rear-window heater, to name only a few. The body control module is connected to the so-called CAN comfort bus. The CAN comfort bus is labeled in FIG. 1 with the reference number 150. Connected thereto are the further control units, i.e., the door control unit 70, the air-conditioning control unit 100, the combination-instrument control unit 80, and the gateway control unit 60.

Typically, one further CAN bus is utilized in the motor vehicle, specifically the so-called CAN drive bus. This bus typically has connected thereto the control units for the engine management, the transmission, and the ESP (electronic stability program). The CAN drive bus is labeled in FIG. 1 with the reference number 140. Connected thereto are the engine control unit 20 and the transmission control unit 30. The gateway control unit 60 is also connected to the CAN drive bus 140, for the purpose of data exchange with the CAN comfort bus 150.

The retrofit relay is provided with the reference number 50 in FIG. 1. It is situated in parallel to the terminal 15 relay 120. Those components are supplied with connected battery voltage via the retrofit relay 50 that are required for the "standstill air conditioning" comfort function, in particular for starting the engine. They are, as shown in FIG. 1, the engine control unit 20 and the transmission control unit 30. In addition, the sensors of the air conditioning system, i.e., the pressure sensor 102 and the air quality sensor 104, are supplied via the retrofit relay. The electric starter 130 must also be supplied to start the engine. This takes place, as usual, via terminal 30, i.e., the vehicle battery is directly connected to two starter relays 132 and 134 which are switched by way of the engine control unit 20.

The further control units and sensors, which are not represented, however, are supplied via the terminal 15 relay 120. Examples of further control units are an airbag control unit and the door control units.

The body control module 10 contains a radio module 12, with the aid of which the body control module can receive and evaluate the signals from a remote control key 160. Assigned thereto is yet another component which is referred to as a function master 14. The function master sets a flag in the body control module 10 when the remote control command for the "standstill air conditioning" comfort function has been received and evaluated. Due to the internal flag having been set, the aRS signal appears at an output of the body control module 10, with the aid of which the activation of the "standstill air conditioning" comfort function (remote start) is signaled. This switching signal is routed to a contact of the retrofit relay 50. The "terminal 15 signal" switching signal is routed to yet another contact of the retrofit relay 50. This switching signal is likewise generated when yet another flag is set in the body control module 10. The further flag is set upon actuation of the "ignition on" function. This usually takes place by way of the ignition key being turned. The retrofit relay 50 is equipped with further contacts. First, there is a contact for the terminal 30, i.e., the battery voltage. In the exemplary embodiment shown, there are even two contacts provided, which are connected to the terminal 30. Secondly, there is a contact for the terminal 31, i.e., the vehicle ground.

Two further contacts are provided in the retrofit relay 50 on the output side. First, there is a contact, via which the switching-on of the terminal 15 is signaled in the "driving mode" operating state. In the "standstill air conditioning" operating state, the switching-on of the terminal 15_RS is signaled via the contact. This line is protected, for example, with a 1A fuse. Since the line is utilized for both the "driving mode" and "standstill air conditioning" operating states, it is labeled with KL15_Signal as well as KL15_RS_Signal.

Secondly, there is a contact, via which the terminal 15 is routed to the outside, i.e., via this contact, the loads connected thereto are supplied with current. Load currents therefore flow across this contact. This line is protected, for example, with a 20A fuse. The connected loads are likewise supplied with current via this contact in the "standstill air conditioning" operating state. This line is labeled with KL15_Last and with KL15_RS_Last, to differentiate.

Figure 2:
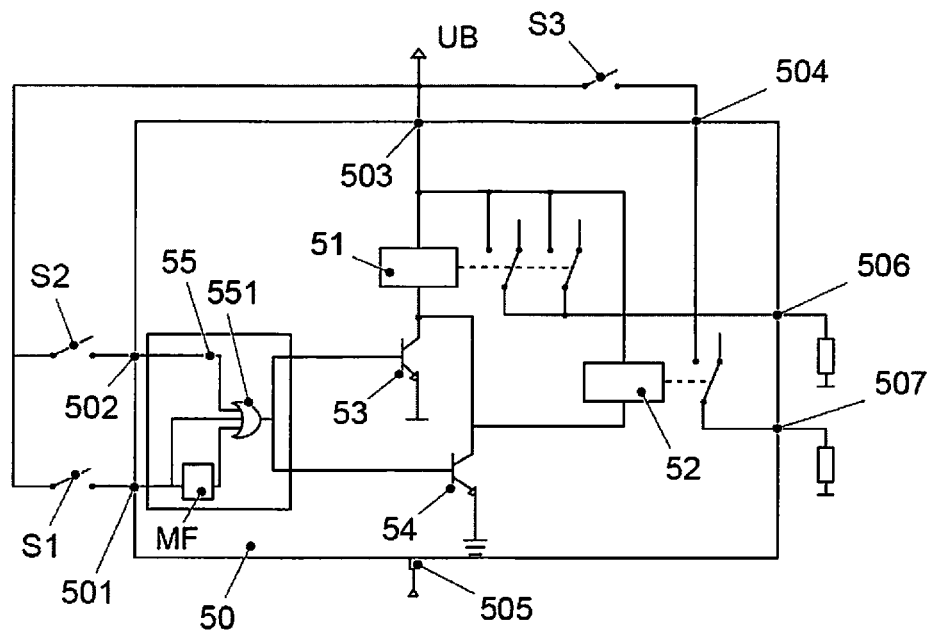
FIG. 2 shows a circuit diagram of the disclosed retrofit relay.

FIG. 2 shows the circuit diagram of the retrofit relay 50. The retrofit relay 50 contains two switching relays 51 and 52. The switching relay 51 connects the KL15_Signal line or the KL15_RS_Signal line to the terminal 30, i.e., to the battery voltage UB. The battery voltage is present at the contacts 503 and 504. The vehicle ground is connected to the contact 505. The switching relay 52 connects the KL15_RS_Last line to the terminal 30. The associated output-side contacts are labeled with the reference numbers 506 and 507. The two switching relays 51, 52 are controlled via correspondingly assigned NPN transistors 53, 54. The two transistors 53, 54 are controlled by a logic circuit 55. In a first exemplary embodiment, the logic circuit 55 contains an OR gate 551 which logically OR combines the two input signals KL15_Signal and aRS which are present at the contacts 501 and 502. The output of the OR gate 551 controls the two transistors 53 and 54. Therefore, either neither or both of the transistors 53, 54 are switched through.

In a second exemplary embodiment, the logic circuit 55 contains a higher logic which combines the two signals and controls the transistors. With the aid of a suitable design of the higher logic, it is possible, in the event of an active KL15_Signal signal, for an activation of the aRS signal to be ignored after the KL15_Signal signal becomes passive The terminal KL. 15_RS is not switched on by the retrofit relay 50 in this case. The higher logic can also be designed in such a way that the KL15_Signal signal overrides the aRS signal. Therefore, a vehicle that has been fully activated by the "ignition on" function is always switched off when "ignition off" occurs, independently of the state of the signal of the "remote start" function. With the aid of the higher logic, it is therefore possible for the "remote start" function to be activated only from the "standstill" ("ignition off") operating state.

A monostable flip-flop MF is also installed upstream from the higher logic or the OR gate 551. This acts for the relay contact 501 at which the aRS signal is present. This particularity is provided to achieve a start pulse strength for the aRS signal. The start pulse strength cannot be guaranteed for the retrofit solution when the aRS signal is output via an output of the body control module 10 that is not designed to have start pulse strength. Typically, not all outputs of the body control module are designed to have start pulse strength. With respect to the output to which the KL15_Signal line is connected, it is typically provided to design this output to have start pulse strength. Therefore, a monostable flip-flop MF is not provided for this contact in this exemplary embodiment. To attain start pulse strength, the voltage dips occurring during the start phase must be buffered out. Therefore, the monostable flip-flop MF is designed in such a way that it can compensate for such voltage dips. The voltage at the input of the monostable flip-flop MF is also routed to an input of the OR gate 551. The start pulse strength can be designed differently depending on the vehicle model. Voltage dips to less than 6V during the start phase are typical. Typical values for the duration of the start phase, i.e., the time period that is to be bridged by the start pulse strength, are in the range 500-700 ms. A start pulse strength is also required for the OR gate 551 or the higher logic. This is achieved by way of the suitable selection of the semiconductor technology in which the OR gate 551 or the higher logic is implemented.

The outer circuit of the retrofit relay 50 is represented in a simplified manner in FIG. 2. The represented switches S1 to S3 are contained in the body control module 10.

Figure 3:
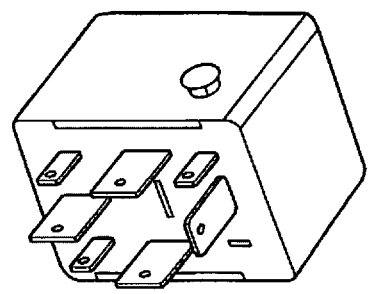
FIG. 3 shows a view of the retrofit relay comprising the arrangement of the relay contacts.

The arrangement of the contacts of the retrofit relay 50 described in conjunction with FIG. 2 is described in greater detail in FIG. 3. Typically, all switching relays are specified for one vehicle manufacturer with a uniform arrangement of relay contacts. The relay receptacles do not need to be individually designed in this case. In this way, the retrofit relay 50 can be plugged into any free receptacle. It only needs to be ensured, with respect to the receptacle, that the associated cables are each connected to the correct pins of the receptacle. This can be carried out manually by a technician in the workshop according to the manufacturer's specifications. In this way, for example, the cables for the KL15_Signal and KL15_Last lines (see also the relay contacts 506, 507) are removed from the plug connector for the switching relay 120 and are plugged into the retrofit relay 50. The components engine control unit 20 and transmission control unit 30 and the sensors 102 and 104 are then switched via the retrofit relay 50 and are no longer switched via the conventional switching relay 120, as described above.

The mode of operation of the retrofit relay 50 is described in greater detail in the following. If the remote control command for the activation of the "standstill air conditioning" function has been received by the radio module 12 during "ignition off", the associated flag is set internally in the body control module 10. As a result, the output of the control unit, at which the aRS signal is output, is set to logical "1". The output at which the KL15 signal is output remains set to logical "0". Due to the logical combination of these two signals, a logical "1" appears at the output of the OR gate 551. Since both transistors 53 and 54 are switched via this signal, both switching relays 51 and 52 are switched and the KL15_RS_Signal and KL15_RS_Last lines are connected to the battery voltage. The control units 20 and 30 receive, via the KL15_RS_Signal signal line, the information that they are connected to the terminal 15. The sensors 102 and 104 are supplied with load current. The electric starter 130 is started by way of the engine control unit 20. As a result, the internal combustion engine is started. Setting the flag for the remote start in the body control module 10 also triggers the transmission of a message via the CAN comfort bus 150. The control units 60, 70, 80, and 100 are permanently supplied via the battery voltage, but they consume only a minimal amount of current, since they are in the sleep state, in which only the CAN transceiver is active. All control units on the CAN comfort bus briefly switch to active and evaluate the received message. The air conditioning control unit 100 will detect that the "standstill air conditioning" operating state has been switched on and remains active to control the air conditioning system. The other control units discard the received message as being not interesting for them and return to the sleep state or remain active, but only provide the functional scope that is available in the "standstill mode" operating state during "ignition off", whereby a selective function disabling is not necessary. In this way, in the "standstill air conditioning" operating state, only the air conditioning control unit 100 and the control units 20, 30 and the sensors 102, 104 connected to the terminal 15 RS actively operate.

In the case in which starting is carried out via an ignition key, i.e., the vehicle is to switch into the "driving mode" operating state, another flag is set in the body control module 10. As a result, a logical "1" signal appears at the output to which the KL15_Signal line is connected. The signal on the aRS line remains logically "0". The processing of both signals in the OR gate 551 yields, in turn, a logical "1" at the output of the OR gate 551. Therefore, the transistors 53, 54 are switched through and, therefore, the relays 51, 52 are switched. The control units 20, 30 are supplied, as are the sensors 102, 140. The internal combustion engine is also started, as described above. The other control units are notified, in a message via the CAN comfort bus, that the flag for "terminal 15 on" has been set and they remain active and switch into the "driving mode" operating state.

The disclosure is not limited to the exemplary embodiments described here. There is room for various adaptations and modifications which a person skilled in the art would also consider, due to his expert knowledge, as also belonging to the disclosure.

LIST OF REFERENCE NUMBERS

10 body control module
12 receiving module
14 function module
20 base station
30 transmission control unit
50 retrofit relay
51 1st relay
52 2nd relay
53 1st transistor
54 2nd transistor
55 logic circuit
501 5th relay contact
502 4th relay contact
503 1st relay contact
504 6th relay contact
505 2nd relay contact
506 3rd relay contact
507 3rd relay contact
551 OR gate
60 gateway
70 door control unit
80 combination-instrument control unit
100 air-conditioning system control unit
102 pressure sensor
104 air quality sensor
120 switching relay
130 electric starter
132 switching relay
134 switching relay
140 CAN bus for drive train
150 CAN bus for comfort components
MF monostable flip-flop
S1 1st switch
S2 2nd switch
S3 3rd switch
UB battery voltage

The invention claimed is:

1. A retrofit relay for use in a motor vehicle for implementation of remote-controlled start of an internal combustion engine of the motor vehicle, the retrofit relay comprising:
    a first relay contact for connection to a battery voltage;
    a second relay contact for connection to a vehicle ground;
    at least one third relay contact for connection to the connected battery voltage;
    a fourth relay contact for connection to a first output of a control unit, which signals switching-on of an "ignition on" function; and
    a fifth relay contact for connection to a second output of the control unit, which signals receipt of a command for the remote-controlled start of the internal combustion engine,
    wherein the retrofit relay contains a logic circuit which executes a combination of the signals of the fourth and the fifth relay contacts.

2. The retrofit relay of claim 1, wherein the logic circuit contains an OR gate, which carries out a logical OR combination of the signals of the fourth and the fifth relay contacts.

3. The retrofit relay of claim 1, wherein the logic circuit contains a higher logic, which prevents the remote-controlled start of the internal combustion engine from operating states other than the "ignition off" operating state.

4. The retrofit relay of claim 1, further comprising a circuit for ensuring a start pulse strength at least for the signal on the fifth relay contact.

5. The retrofit relay of claim 4, wherein the switching for ensuring a start pulse strength is a monostable flip-flop.

6. The retrofit relay of claim 5, wherein the mono stable flip-flop compensates for a dip in the signal voltage on the fifth relay contact for at least a predetermined time.

7. The retrofit relay of claim 1, wherein the logic circuit has a start pulse strength.

8. A motor vehicle comprising an internal combustion engine which implements the function of the remote-controlled start of the internal combustion engine, the motor vehicle comprising:
    a receptacle for a retrofit relay for use in a motor vehicle for implementation of remote-controlled start of an internal combustion engine of the motor vehicle, the retrofit relay comprising:
    a first relay contact for connection to a battery voltage;
    a second relay contact for connection to a vehicle ground;
    at least one third relay contact for connection to the connected battery voltage;
    a fourth relay contact for connection to a first output of a control unit, which signals switching-on of an "ignition on" function; and
    a fifth relay contact for connection to a second output of the control unit, which signals receipt of a command for the remote-controlled start of the internal combustion engine,
    wherein the retrofit relay contains a logic circuit which executes a combination of the signals of the fourth and the fifth relay contacts,
    wherein the contact connections are occupied by the corresponding cables of the motor vehicle wiring harness.

9. The motor vehicle of claim 8, wherein the logic circuit contains an OR gate, which carries out a logical OR combination of the signals of the fourth and the fifth relay contacts.

10. The motor vehicle of claim 8, wherein the logic circuit contains a higher logic, which prevents the remote-controlled start of the internal combustion engine from operating states other than the "ignition off" operating state.

11. The motor vehicle of claim 8, further comprising a circuit for ensuring a start pulse strength at least for the signal on the fifth relay contact.

12. The motor vehicle of claim 11, wherein the switching for ensuring a start pulse strength is a monostable flip-flop.

13. The motor vehicle of claim 12, wherein the monostable flip-flop compensates for a dip in the signal voltage on the fifth relay contact for at least a predetermined time.

14. The motor vehicle of claim 8, wherein the logic circuit has a start pulse strength.

\* \* \* \* \*